| (12) | United States Patent | (10) Patent No.: | US 9,052,707 B2 |
|---|---|---|---|
| | Quitter | (45) Date of Patent: | Jun. 9, 2015 |

(54) TURBOMACHINE COMPONENT MACHINING METHOD

(75) Inventor: John Quitter, Farmington, CT (US)

(73) Assignee: United Technologies Corporation, Hartford, CT (US)

( * ) Notice: Subject to any disclaimer, the term of this patent is extended or adjusted under 35 U.S.C. 154(b) by 772 days.

(21) Appl. No.: 13/309,885

(22) Filed: Dec. 2, 2011

(65) Prior Publication Data

US 2013/0142633 A1 Jun. 6, 2013

(51) Int. Cl.
 *B23K 26/388* (2014.01)
 *F02K 1/82* (2006.01)
 *G05B 19/4093* (2006.01)
 *B23K 26/38* (2014.01)

(52) U.S. Cl.
 CPC ..... *G05B 19/40937* (2013.01); *Y10T 29/49229* (2015.01); *B23K 26/388* (2013.01); *F02K 1/822* (2013.01); *B23K 2201/001* (2013.01); *Y02T 50/675* (2013.01); *G05B 2219/36214* (2013.01); *G05B 2219/49381* (2013.01)

(58) Field of Classification Search
 CPC B23K 26/388; B23K 2201/001; F02K 1/822; G05B 2219/36219; G05B 19/40937
 USPC .................................. 415/115, 116, 175–178
 See application file for complete search history.

(56) References Cited

U.S. PATENT DOCUMENTS

| 5,037,183 | A | 8/1991 | Gagosz et al. |
|---|---|---|---|
| 5,319,567 | A | 6/1994 | Ebenstein |
| 5,465,572 | A | 11/1995 | Nicoll et al. |
| 6,977,356 | B2 | 12/2005 | Vaidyanathan et al. |
| 7,333,218 | B2 | 2/2008 | Vaidyanathan |
| 7,388,980 | B2 | 6/2008 | Vaidyanathan |
| 7,538,296 | B2 | 5/2009 | Elfizy |
| 2002/0076097 | A1 | 6/2002 | Vaidyanathan |
| 2004/0003585 | A1* | 1/2004 | Allore et al. ..................... 60/266 |
| 2007/0019213 | A1* | 1/2007 | Vaidyanathan ............... 356/626 |

FOREIGN PATENT DOCUMENTS

| EP | 0486133 | 5/1992 |
|---|---|---|
| EP | 1510283 | 3/2005 |
| EP | 2093641 | 8/2009 |
| WO | 0232614 | 4/2002 |

OTHER PUBLICATIONS

European Search Report for European Application No. 12195275.8 dated Apr. 4, 2013.

* cited by examiner

*Primary Examiner* — Edward Look
*Assistant Examiner* — Jesse Prager
(74) *Attorney, Agent, or Firm* — Carlson, Gaskey & Olds, P.C.

(57) ABSTRACT

An exemplary component manufacturing method includes scanning a first surface of a component to determine a location of pocket surfaces of the first surface. The method machines apertures in the component from a second, opposite surface of the component. The apertures each have a cooling air inlet within one of the pocket surfaces and a cooling air outlet within the first surface.

18 Claims, 5 Drawing Sheets

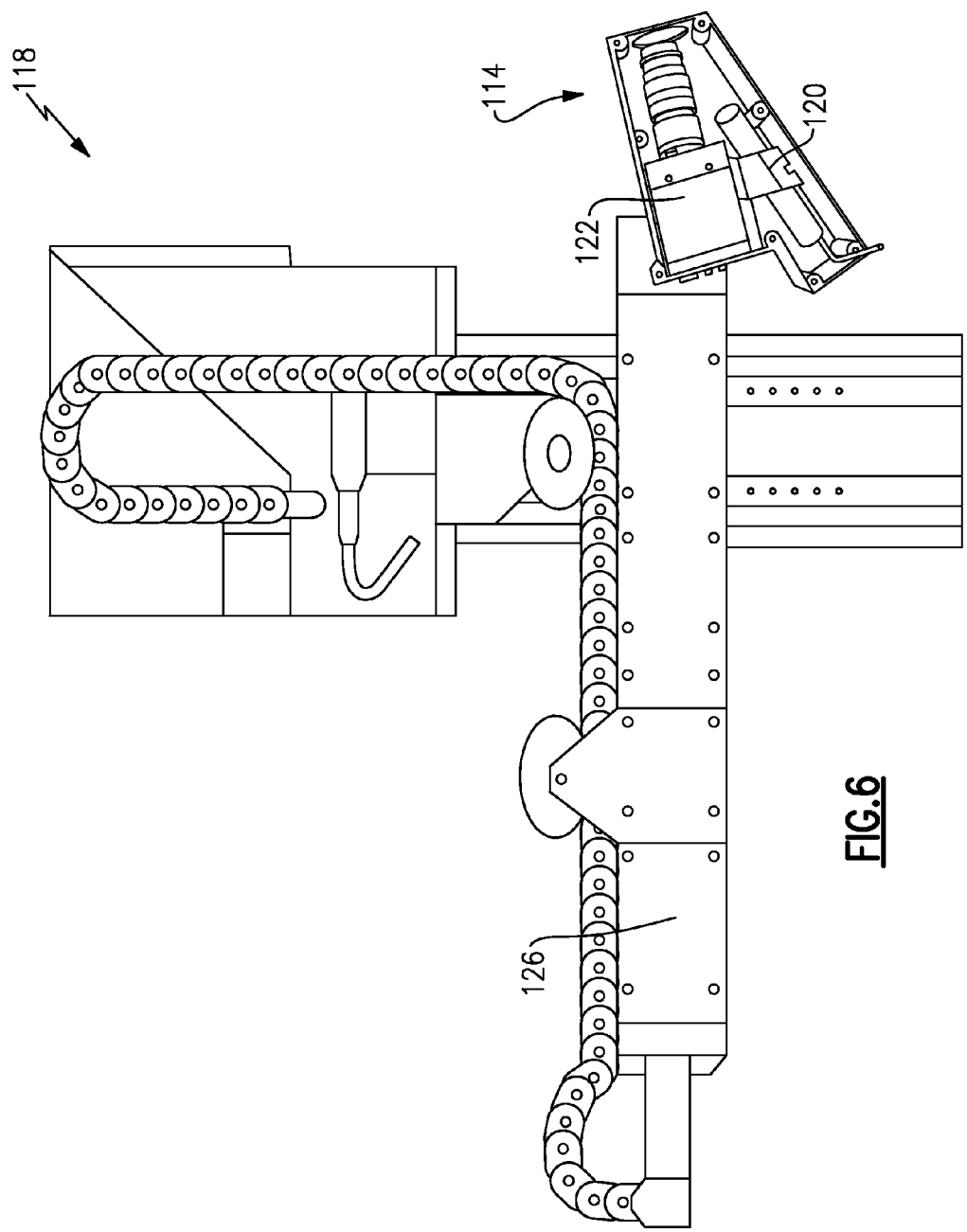

TURBOMACHINE COMPONENT MACHINING METHOD

BACKGROUND

This disclosure relates generally to machining turbomachine components and, more particularly, to machining cooling holes in a turbomachine liner.

Turbomachines, such as gas turbine engines, include components exposed to high levels of thermal energy. Cooling air is often used to remove thermal energy from these components.

For example, in the nozzles of some turbomachines, liners are used to direct the superheated exhaust stream. The liner is primarily a cast metallic alloy, and portions of the liner are exposed to the superheated exhaust stream. The temperature of the superheated exhaust stream exceeds the melting point of the metallic alloys of the liner. According, liners often include cooling holes. Cooling air moves through these cooling holes to provide a surface cooling envelope that repels the superheated exhaust stream. The cooling holes are machined in the liners using a laser drill, for example.

Positioning the cooling holes within some areas of the liner can undesirably weaken the liner as is known. Current cooling hole machining operations use complex and laborious processes to avoid position cooling holes in such areas.

SUMMARY

An exemplary method of manufacturing a turbomachine liner includes scanning a first surface of the liner. The method also includes machining apertures in the liner from a second, opposite surface of the liner. The apertures are positioned within the liner based on the scanning.

An exemplary component manufacturing method includes scanning a first surface of a component to determine a location of pocket surfaces of the first surface. The method machines apertures in the component from a second, opposite surface of the component. The apertures each have a cooling air inlet within one of the pocket surfaces and a cooling air outlet within the second surface.

An exemplary turbomachine liner assembly includes a liner having a first surface and a second surface facing in an opposite direction from the first surface. Cooling apertures extend through the liner from the first surface to the second surface. The cooling apertures are positioned within the liner based on a scan of the second surface.

DESCRIPTION OF THE FIGURES

The various features and advantages of the disclosed examples will become apparent to those skilled in the art from the detailed description. The figures that accompany the detailed description can be briefly described as follows:

FIG. 6 shows a model of the 3D laser scanning measurement device with the computer controlled multi-directional manipulation apparatus, as illustrated in the FIG. 4 machining operation.

DETAILED DESCRIPTION

Figure 1:
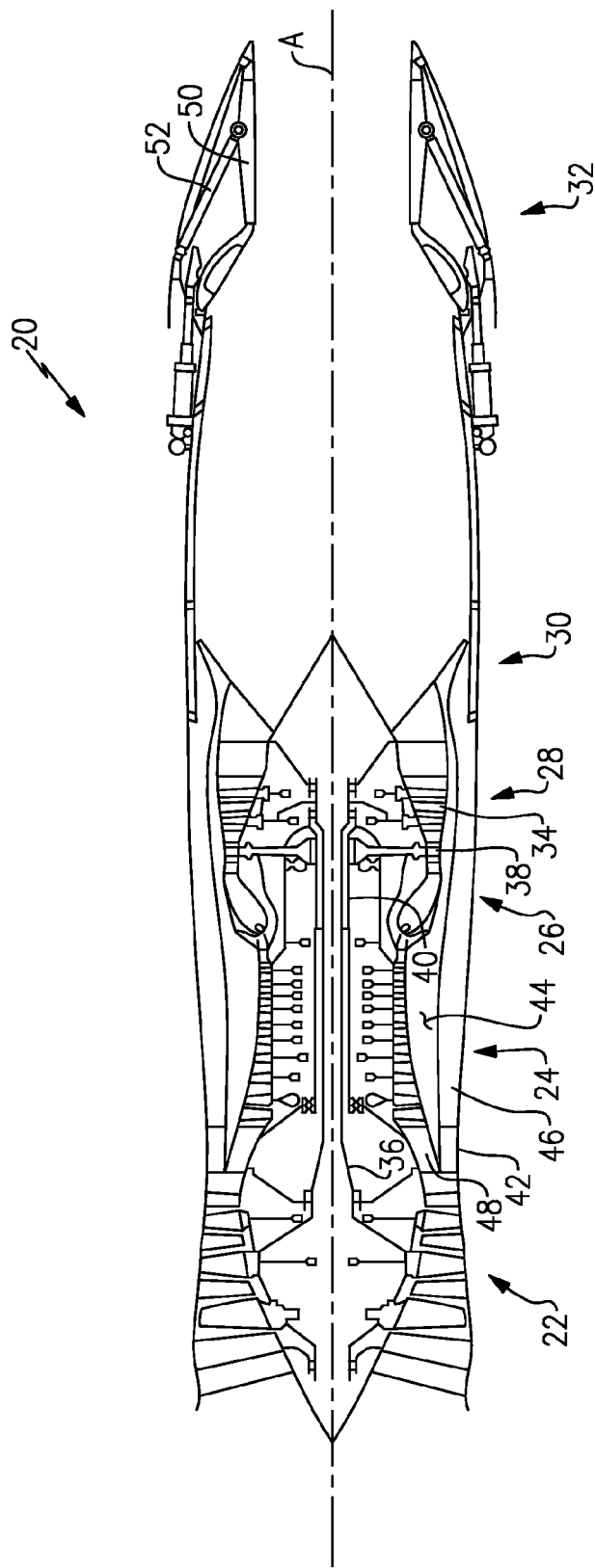
FIG. 1 shows a general perspective view of an example turbomachine.

Referring to FIG. 1, an example turbomachine 20 is a two-spool turbofan engine that includes a fan section 22, a compressor section 24, a combustor section 26, a turbine section 28, an augmenter section 30, and a nozzle section 32. The sections are defined along a central longitudinal axis A.

The example turbomachine is an augmented low-bypass gas turbine engine. Those having skill in this art and the benefit of this disclosure will understand that the concepts described in this disclosure are applicable to components of other devices, and other turbomachines, such as gas turbine engines having geared architectures, direct drive turbofans, turboshaft engines, etc.

The compressor section 24, the combustor section 26, and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

An outer engine case structure 42 and an inner engine structure 44 define a generally annular secondary flow path 46 about a core flow path 48 of the engine core. Air that enters the fan section 22 is divided between a core flow through the core flow path 48 and a secondary flow through the secondary flow path 46. The core flow passes through the combustor section 26, the turbine section 28, then to the augmenter section 30 where fuel is selectively injected and burned to generate additional thrust through the nozzle section 32. The secondary flow is utilized for various purposes including, for example, cooling and pressurization.

The nozzle section 32 of the example turbomachine 20 includes at least one liner assembly 50. Hinges attach the liner assembly 50 to the remaining portions of the turbomachine 20. A hydraulic actuator 52 actuates to pivot the liner assembly 50 about the hinges, which changes the position of the liner assembly 50 relative to the axis A to alter the direction of thrust from the turbomachine 20. Manipulating the liner 50 of the turbomachine 20 to manipulate the direction of thrust is also known as thrust vectoring.

Figure 2:
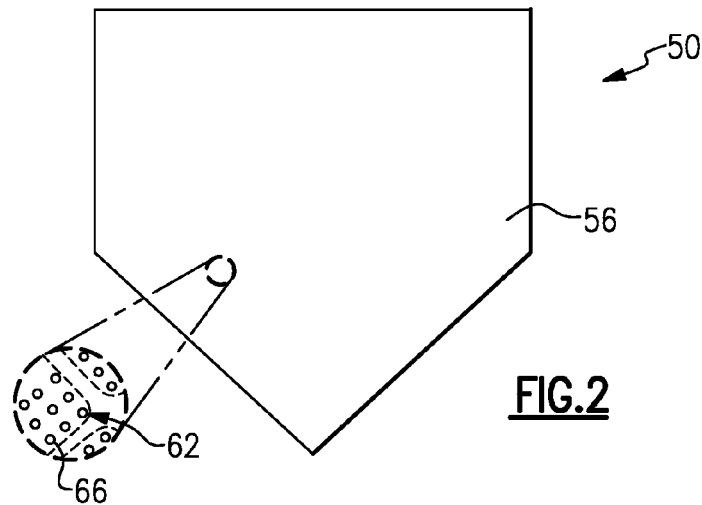
FIG. 2 shows an axially facing surface of a liner within the nozzle of the FIG. 1 turbomachine.
Figure 3:
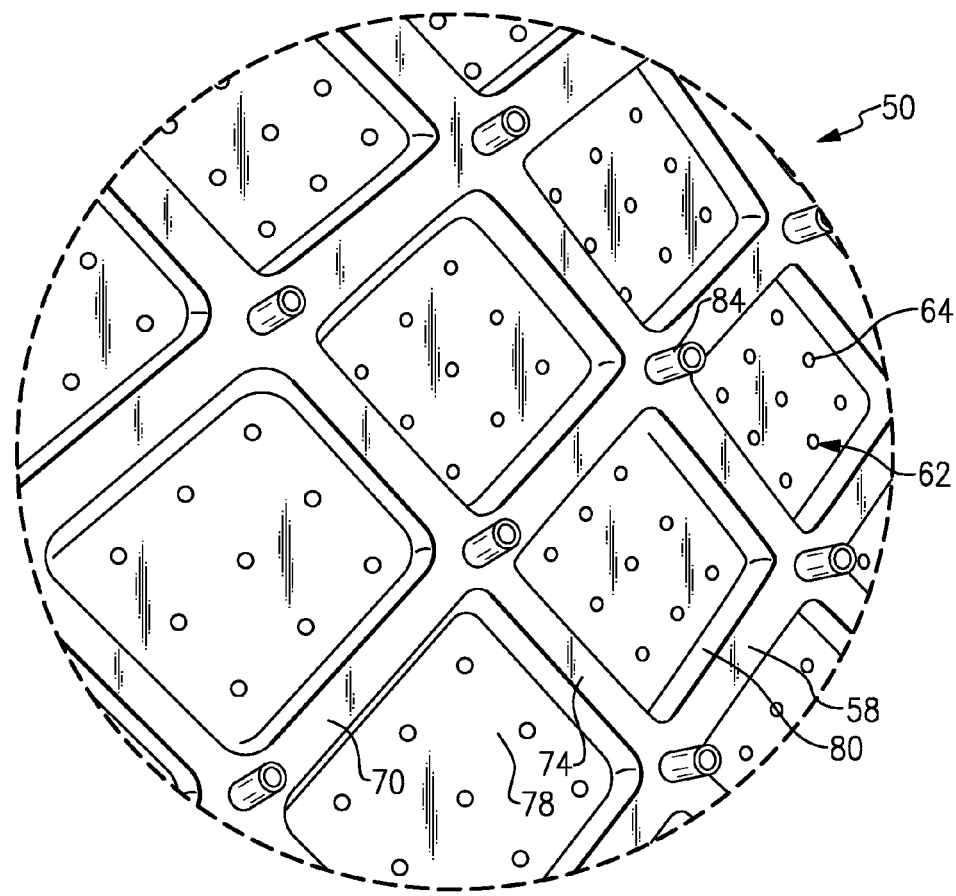
FIG. 3 shows a close-up view of a surface of the liner that is opposite the FIG. 2 surface.

Referring to FIGS. 2 and 3, the example liner 50 includes a first surface 56 and a second surface 58. The first surface 56 faces the axis A when the liner 50 is in an installed position within the turbomachine 20. The second surface 58 faces away from the axis A with the liner 50 is in an installed position within the turbomachine 20.

As can be appreciated, the liner 50, and particularly the first surface 56, is exposed to high levels of thermal energy during operation of the turbomachine 20, particularly when the liner 50 is moved to a position closer to the axis A. To remove thermal energy from the liner 50, cooling air is communicated through a plurality of apertures 62 within the liner 50. Generally, the air moves through the apertures 62 toward the axis A. A cooling air supply, such as the secondary flow through the turbomachine 20, provides the cooling air to the aperture 62.

Each of the example apertures 62 are cylindrical and extend from an inlet 64 to an associated outlet 66. The diameters of the example apertures 62 are each about 0.610 millimeters (0.024 inches). The inlets 64 of the apertures 62 are established within the first surface 56. The outlets 66 of the apertures 62 are established within the second surface 58.

The first surface 56 of the example liner 50 is a ceramic surface, and the second surface 58 is a metallic surface. These dissimilar surfaces often require machining apertures 62 from the ceramic surface to the metallic surface, as is known.

The liner 50 includes a plurality of raised ribs 70 extending across the liner 50. In this example the ribs 70 extend transversely to the axis A. In this example, the ribs 70 are exclusively located on a side of the liner 50 that faces away from the axis A. The first surface 56 of the liner 50, by contrast, is relatively smooth.

In this example, the second surface 58 of the liner 50 includes a plurality of ribbed surfaces 74 and a plurality of pocket surfaces 78 positioned between the ribbed surfaces 74. The example ribbed surfaces 74 are parallel to the pocket surfaces 78. The ribbed surfaces 74 are positioned further from the first surface 56 than the pocket surfaces 78.

The second surface 58 also includes transition surfaces 80 that extend between the pocket surfaces 78 and the ribbed surfaces 74. The example transition surfaces 80 have a radius. The ribs 70 of the second surface 58 may include both the transition surfaces 80 and the ribbed surfaces 74.

In this example, the ribs 70 of the liner 50 are between 2.29 and 3.81 millimeters (0.090 and 0.150 inches) wide and approximately 2.54 millimeters (0.100 inches) thick. The thickness of the liner 50, which is the distance between the first surface 56 and the second surface 58, is between 4.06 and 5.08 millimeters (0.160 and 0.200 inches).

The dimensions of the pockets in the example liner 50 are approximately 25.4 millimeters (1 inch) square. The pockets are defined by the pocket surfaces 78 and the transition surfaces 80. The radii of the example transition surfaces 80 are between 1.27 and 2.03 millimeters (0.050 and 0.080 inches).

In this example, extensions 84 protrude outward away from other portions of the liner 50 at the intersections of the ribs 70. In one example, a main portion of the liner 50 is a cast from an Inconel 625 alloy, for example. Next, the pocket surfaces 78 are chemically etched into the liner 50.

The extensions 84 are then welded onto the cast portion. The extensions 84 provide locations for bolting a metering plate (not shown) that, when the liner 50 is installed within the turbomachine 20, directs air into the apertures 62.

Notably, the apertures 62 of the example liner 50 are spaced from the ribs 70. That is, no portion of the apertures 62 intersects the ribs 70, and the inlets 64 of the apertures 62 are spaced from both the ribbed surfaces 74 and the transition surfaces 80. Spacing the apertures 62 from the ribs 70 avoids weakening the ribs 70 due to the apertures 62. If a laser drill is used to form the apertures 62, the spacing helps limit laser backstrike damage, which is where the laser from the laser drill exits the liner 50 and hits the ribs 70.

The inlets 64 of the example apertures 62 are formed exclusively within the pocket surfaces 78 of the second surface 58. In this example, most of the pocket surfaces 78 establish nine inlets 64.

Figure 4:
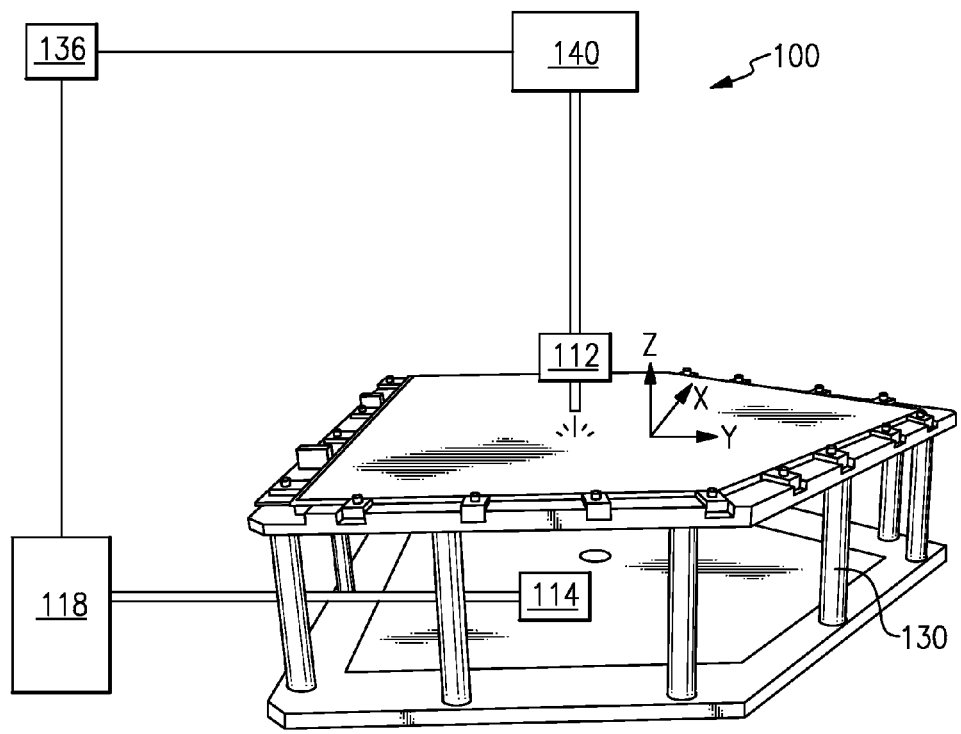
FIG. 4 shows the FIG. 2 liner attached to the machine-tool fixture, including a partial schematic view of the multi-axis cooling hole machining apparatus and the underside surface feature scanning device.
Figure 5:
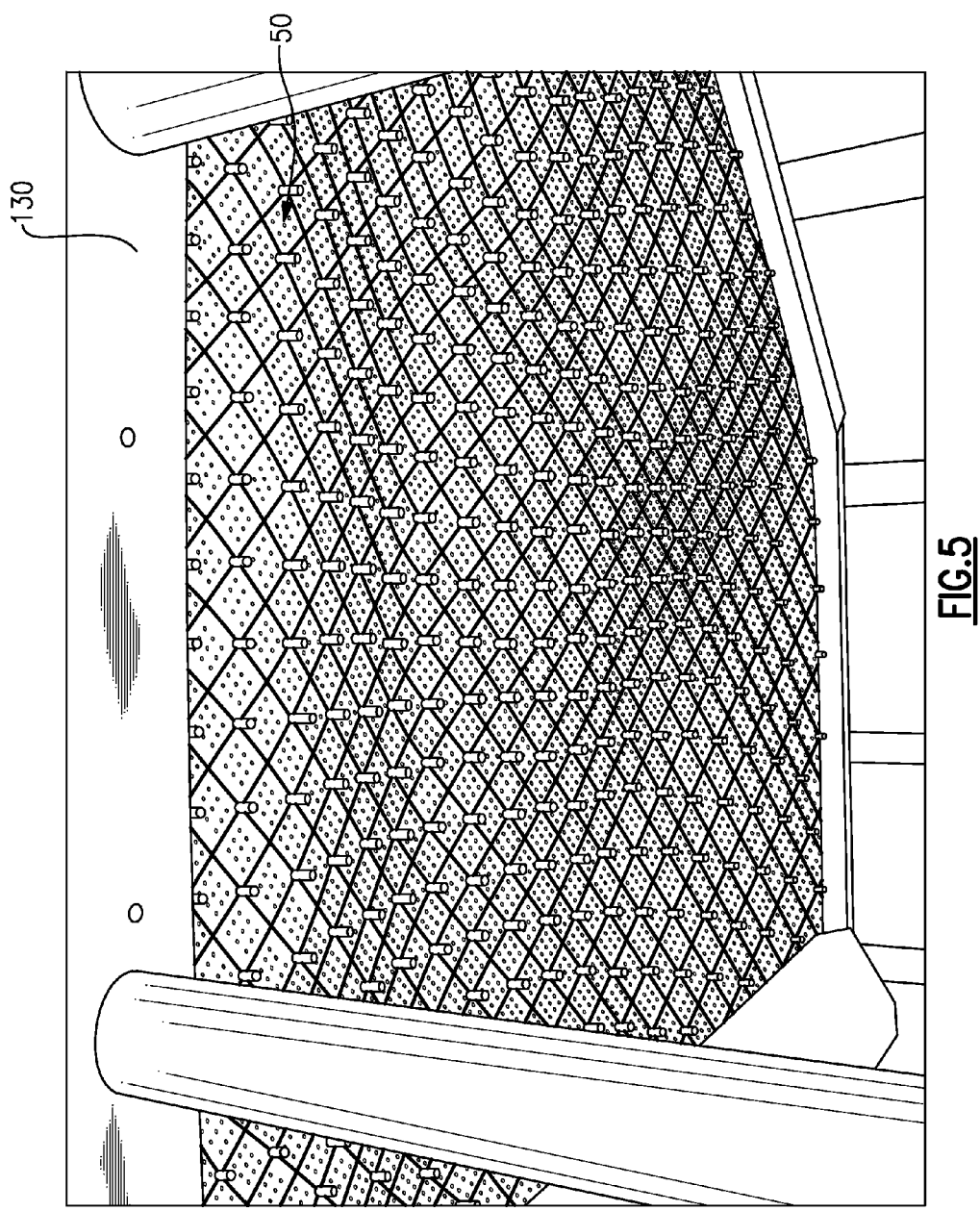
FIG. 5 shows the serpentine geometry and surface feature details of the FIG. 2 liner panel from the underside machine-tool fixtured orientation.

Referring now to FIGS. 4 to 6 with continuing reference to FIGS. 1 to 3, a machining apparatus 100 positions and machines the aperture 62 within the liner 50.

The machining apparatus 100 includes a drilling device 112 and a scanner 114. The machining apparatus 100 utilizes the scanner 114 to help determine appropriate areas of the liner 50 for the drilling device 112 to drill the apertures 62. The example drilling device 112 is a laser drill, and the example scanner 114 is a 3D scanner.

During the scanning, the scanner 114 moves relative to the liner 50. A multi-axis control system 118, in this example, is used to move the scanner 114 during the scanning.

The pocket surfaces 78 of the second surface 58 are generally arranged in rows. The multi-axis control system 118 may, for example, move the scanner 114 across one of the rows, and then an adjacent row.

In this example, information from the example scanner 114 is used to create a 3D map of some or the entire second surface 58. The information from the scanner 114 is point cloud data file in one example, although could also be used to measure positive and negative feature dimensions.

The example scanner 114 includes a laser line scanner 120 and an imaging camera 122. The scanner 114 is configured to measure points of the second surface 58 in 3D free space and then assemble a point cloud map of the second surface 58. An extension arm 126 of the multi-axis control system 118 is used to manipulate the position of the scanner 114.

Although the example scanner 114 moves during the scanning. The scanner 114 may remain stationary in other examples.

In this example, a controller module 136 uses laser scanned surface map data, such as the point cloud date file from the scanner 114, to position the drilling device 112. As can be appreciated, the data reveals locations of the ribs 70, the pocket surfaces 78, etc. of the second surface 58. The laser scanned surface map data may be stored in a buffer of the controller module 136, which communicates coordinate information identifying the locations of the pocket surfaces 78 to another multi-axis controller 140. The drilling device 112 is then moved to appropriate drilling location by the multi-axis controller 140.

The drilling device 112 then drills one of the apertures 62 at the location. The apertures 62 extend at about a 30 degree angle to the Z axis.

After drilling, the controller module 136 initiates movement of the drilling device 112 to another position. The drilling device 112 then drills another of the apertures 62. This process continues until the drilling device 112 has drilled all of the apertures 62 in the liner 50.

The controller module 136 selects the coordinates for the drilling device 112 so that the apertures 62 will be spaced from the ribs 70. More specifically, the apertures 62 extend to inlets 64 exclusively within the pocket surfaces 78 of the second surface 58.

A fixture 130 holds the liner 50 during the machining. The coordinates may be relayed to the multi-axis controller 140 based on a reference point of the fixture 130, the liner 50, or both.

Figure 7:
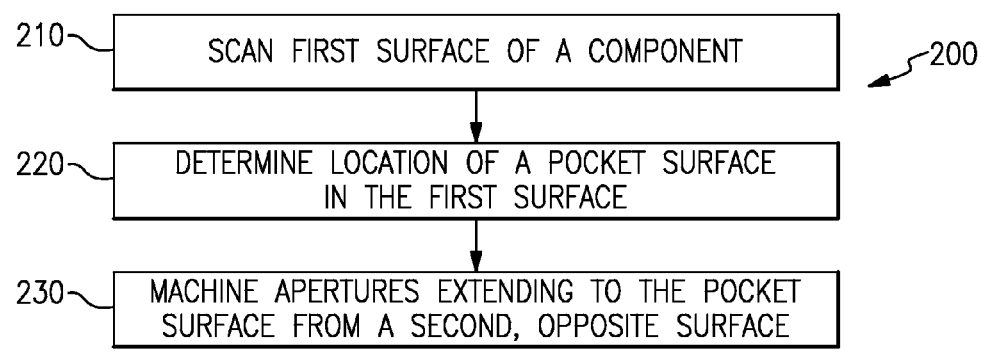
FIG. 7 shows the steps of an example method of manufacturing the FIG. 2 liner.

Referring to FIG. 7, the flow of an example component manufacturing method 200 includes scanning a first surface of a component at a step 210. In this example, the method 200 determines a location of a pocket surface of the first surface at a step 220. The method 200 uses information from the scanning to determine the location in the step 220.

The method 200 next machines apertures in the component from a second, opposite surface of the component at a step 230. The apertures provide a cooling air inlet within one of the pocket surfaces and a cooling air outlet within the first surface.

Features of the disclose example include correlating the positions of apertures drilled in the liner from a first side, to structure on a second, opposite side.

The preceding description is exemplary rather than limiting in nature. Variations and modifications to the disclosed examples may become apparent to those skilled in the art that do not necessarily depart from the essence of this disclosure.

Thus, the scope of legal protection given to this disclosure can only be determined by studying the following claims.

I claim:

1. A turbomachine liner manufacturing method comprising:

scanning a first surface of a liner;

machining apertures in the liner from a second, opposite surface of the liner; and positioning the apertures within the liner based on the scanning.

2. The method of claim 1, wherein the first surface comprises a plurality of ribs.

3. The method of claim 2, wherein the apertures each extend from a cooling air inlet within the first surface to a cooling air outlet within the second surface, and the positioning comprises spacing the cooling air inlet from the plurality of ribs.

4. The method of claim 3, including machining the cooling air outlet before the cooling air inlet.

5. The method of claim 1, wherein the first surface is a metallic surface and the second surface is a ceramic surface.

6. The method of claim 1, wherein the first surface comprises a plurality of rib surfaces, a plurality of pocket surfaces that are closer to the first surface than the rib surfaces, and a plurality of transition surfaces joining the rib surfaces to the pocket surfaces.

7. The method of claim 6, wherein the machining is exclusively within the plurality of pocket surfaces of the first surface.

8. The method of claim 6, including determining locations of the plurality of pocket surfaces using the scanning.

9. The method of claim 6, including extensions from the first surface at the intersections of the plurality of rib surfaces.

10. The method of claim 1, wherein the machining comprises using a laser drill to provide the apertures.

11. The method of claim 1, wherein a device that is machining is closer to the second surface than the first surface.

12. A component manufacturing method comprising:

scanning a first surface of a component to determine a location of at least one of a plurality of pocket surfaces of the first surface; and machining apertures in the component from a second, opposite surface of the component, the apertures each having a cooling air inlet within one of the plurality of pocket surfaces and a cooling air outlet within the first surface.

13. The component manufacturing method of claim 12, wherein the first surface is a metallic surface and the second surface is a ceramic surface.

14. The component manufacturing method of claim 12, wherein each of the plurality of pocket surfaces are located between rib surfaces of the first surface.

15. The component manufacturing method of claim 12, wherein the cooling air outlet for the aperture is machined before the cooling air inlet.

16. The component manufacturing method of claim 12, wherein the machining comprises laser drilling.

17. The method of claim 1, wherein the liner, prior to the scanning, is unapertured, and the liner, after the machining, includes apertures.

18. The component manufacturing method of claim 12, wherein the component is an unapertured component during the scanning.

* * * * *